Jan. 18, 1966  E. A. LEWCZYK  3,230,308

POSITIONING APPARATUS

Filed April 15, 1963  5 Sheets-Sheet 1

INVENTOR
EDWARD A. LEWCZYK

BY Raymond W. Trotter

ATTORNEY

Jan. 18, 1966  E. A. LEWCZYK  3,230,308
POSITIONING APPARATUS
Filed April 15, 1963  5 Sheets-Sheet 2
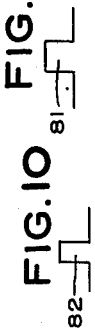
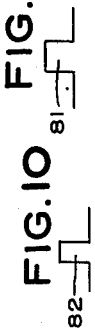
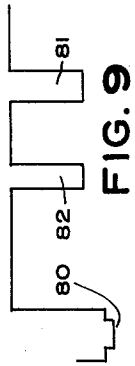
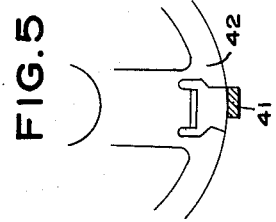
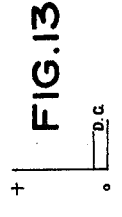
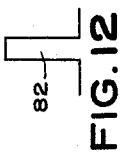
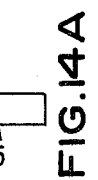
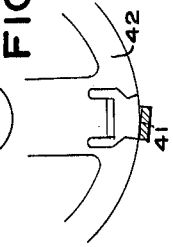
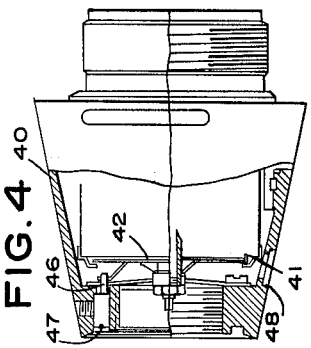
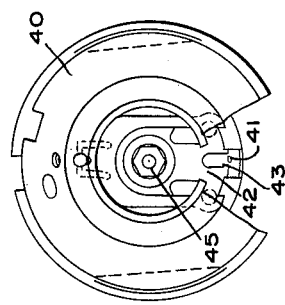
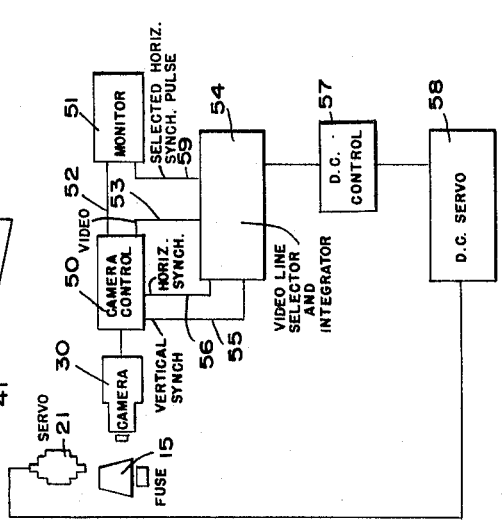
INVENTOR
EDWARD A. LEWCZYK
BY Raymond W. Colton
ATTORNEY Jan. 18, 1966     E. A. LEWCZYK     3,230,308
POSITIONING APPARATUS
Filed April 15, 1963     5 Sheets-Sheet 3
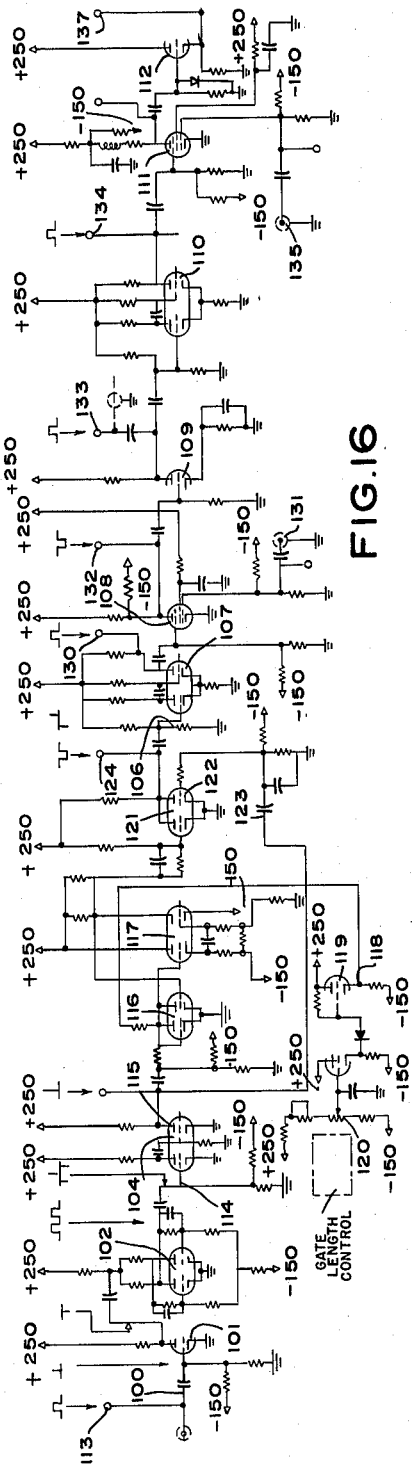
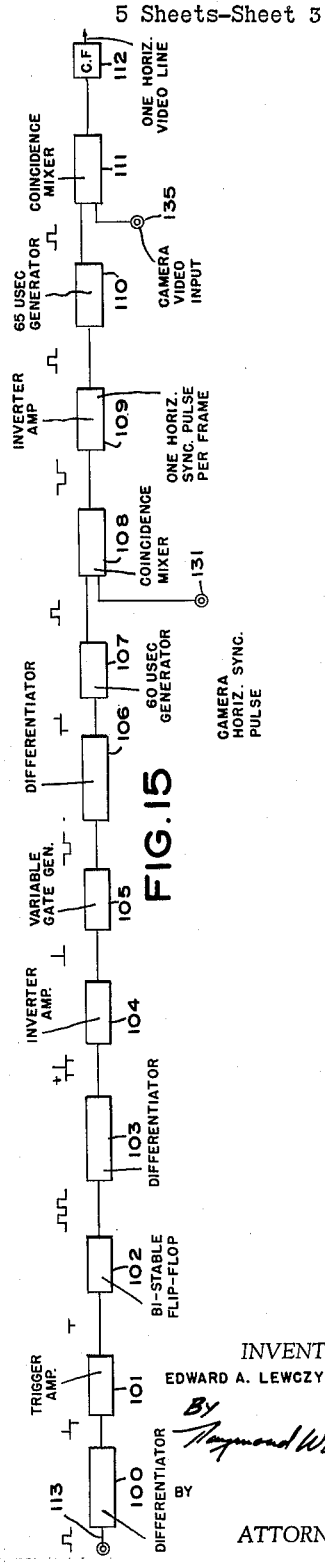
INVENTOR
EDWARD A. LEWCZYK
BY
ATTORNEY

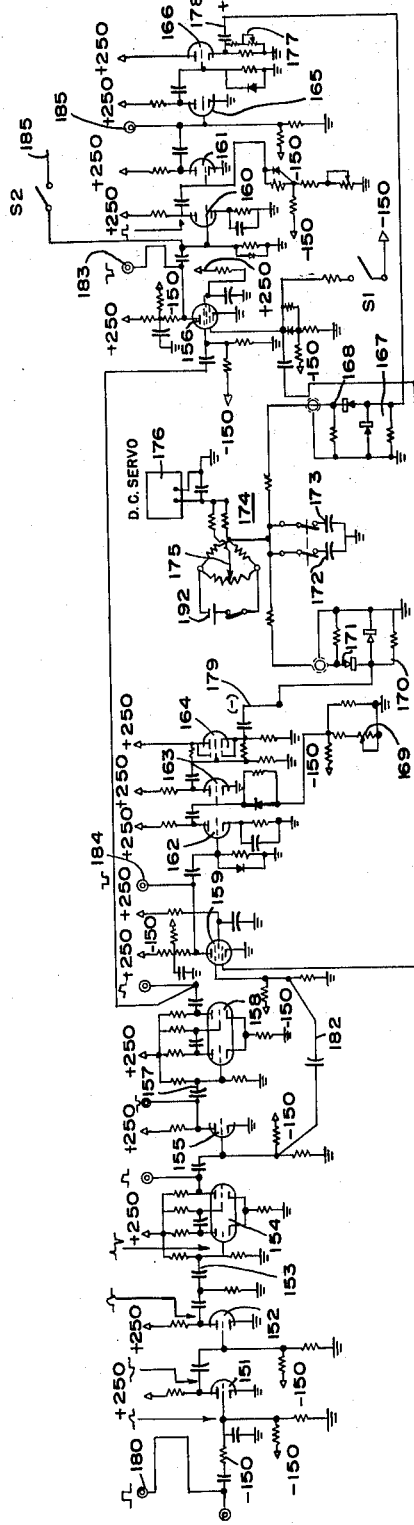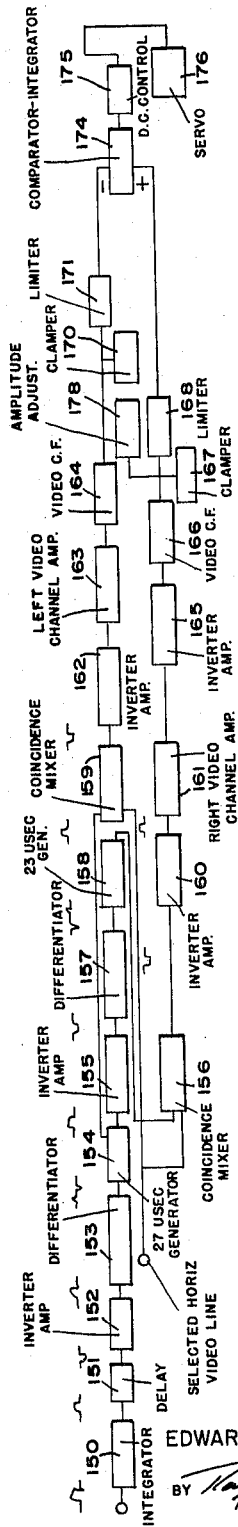
FIG.18
FIG.17
INVENTOR
EDWARD A. LEWCZYK
ATTORNEY

Jan. 18, 1966     E. A. LEWCZYK     3,230,308
POSITIONING APPARATUS
Filed April 15, 1963     5 Sheets-Sheet 5
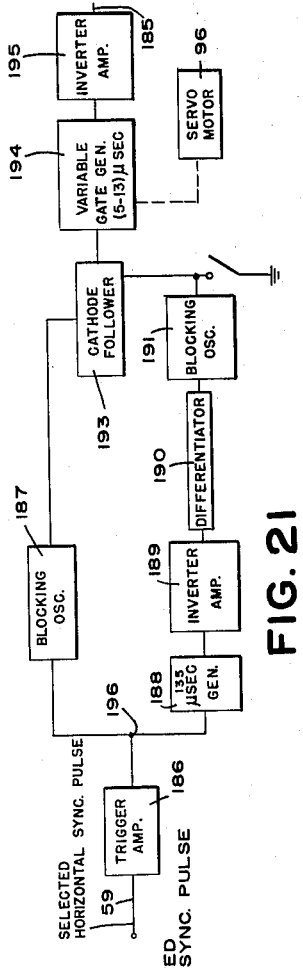
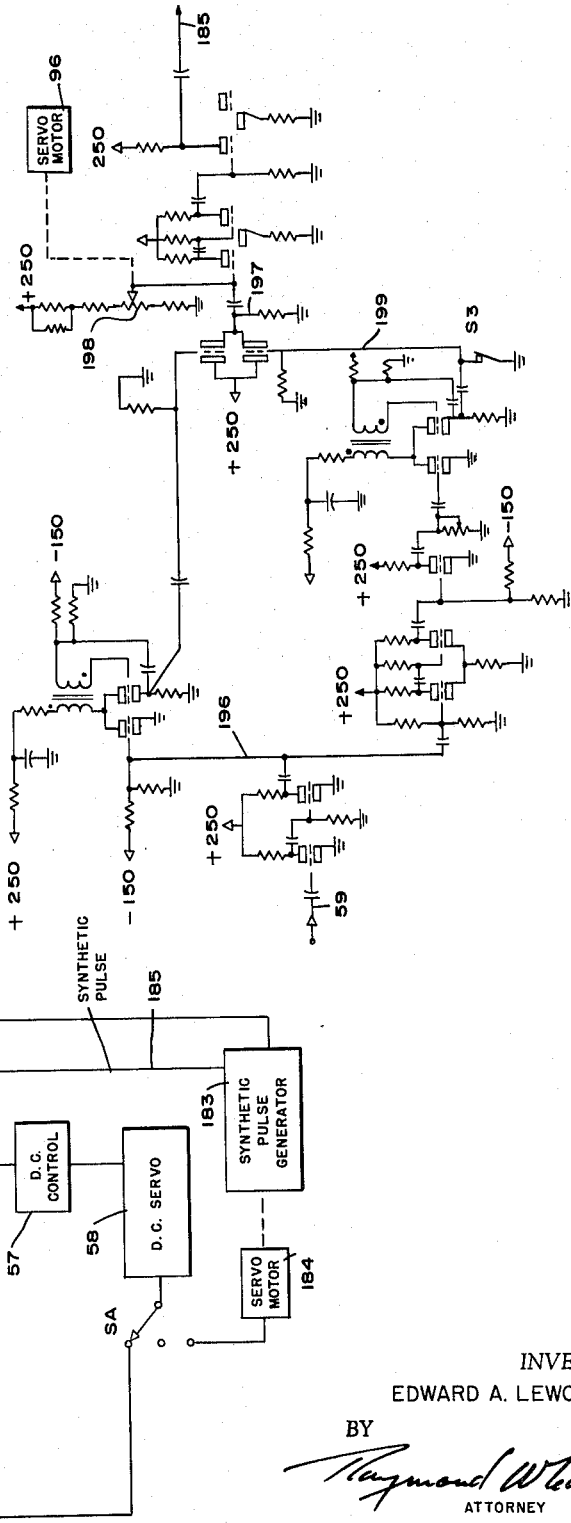
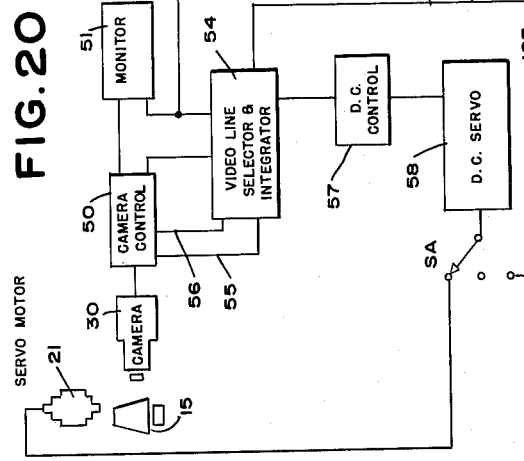
INVENTOR.
EDWARD A. LEWCZYK
BY
ATTORNEY United States Patent Office 3,230,308
Patented Jan. 18, 1966

3,230,308
POSITIONING APPARATUS
Edward A. Lewczyk, Newington, Conn., assignor to Jolew Corporation, Newington, Conn., a corporation of Connecticut
Filed Apr. 15, 1963, Ser. No. 272,983
20 Claims. (Cl. 178—6.8)

The present invention relates to servo systems and more particularly to servo systems which may be used to position one object in a predetermined relation to another object.

It is often necessary to position one object in a precisely predetermined position relative to another object. For example, armament fuzes usually include a firing arm and a timing disk having a gap within which the firing arm should be precisely positioned. It is desirable to provide automatic servo operated mechanisms to position the timing arm of such a fuze in order to eliminate the difficulties of visually and manually adjusting the position of the timing arm and to increase the speed and accuracy of the positioning.

It is a principal object of the present invention to provide a video responsive servo system for precisely positioning an object relative to another object by electro-optical means.

Another important object of the present invention is to provide a video responsive servo system for quickly and precisely positioning an object in a gap such as a fuze firing arm in a fuze timing disk gap.

Another object of the present invention is to provide a video responsive servo system for positioning an object relative to another object and for visually displaying the relative positions of the objects at all times during the positioning operation utilizing both optical and electronic magnification.

In practicing the invention, the objects to be adjusted such as a fuze with a firing arm to be precisely positioned in a timing disk gap, are placed in a suitable holder such that the firing arm and timing disk gap are visible to a television or other type of video camera for producing a composite video output signal representative of the shape and positions of the fuze, firing arm and gap. To this end, light may be reflected or otherwise transmitted from the fuze and magnified if desired to be projected on the target of the video camera. A repetitive straight line signal representing a line passing through the firing arm and timing gap is selected from every complete frame of the composite video signal and respective direct current voltage signals representative of the sizes of the gaps on each side respectively of the firing arm are derived therefrom. The aforementioned direct current signals are compared to each other and a difference signal is thereby obtained which is connected to a suitable direct current servo motor system for driving adjustment apparatus to adjust the position of the timing disk gap. The servo system at this point may be somewhat conventional in that the servo adjustments are continuously made until the aforementioned direct current signals are equal to predetermined values and their difference when related to an adjustable preset signal is zero, thus indicating that the timing disk gap is precisely positioned in the desired relation to the firing arm. A particular feature of the invention is the provision of a television monitor screen which may be connected to the composite video output of the video camera to visually display the fuze, firing arm and timing disk gap at substantial magnification during the servo adjustment. Also in accordance with the invention when using a monitor, the aforementioned line selecting means may also be connected to the monitor to emphasize in brightness the particular horizontal line being used for deriving the servo signals.

The servo system of the invention has many advantages in addition to those already mentioned which will be apparent from the following specification and drawings. However, it is desirable to point out that when using the monitor the picture information on the screen of the monitor reveals more to a viewer than would a magnifying glass held in the hands of the viewer, because the video camera and monitor arrangement enables magnification to a very great degree and the magnified image on the display screen can be viewed by more than one person at a time when it is desired to observe the operations of the servo system. The system thus permits precise gaging without physical contact. By simply reversing the polarity of the video signal, the shadows of parts under study may be changed to highlights to facilitate visual study thereof.

Further objects, features and the attending advantages of the invention will be apparent with reference to the following specification and drawings, in which:

FIG. 2 is a block diagram of the servo system of the invention showing both the apparatus and the electrical circuits in their relative relationships.

FIG. 3 is a top plan view of a fuze which may be automatically adjusted by the servo system of the invention.

FIG. 4 is a side elevation, partly in section, of the fuze seen in FIG. 3.

FIGS. 5, 6 and 7 are diagrammatic views showing the timing disk and firing arm of a fuze in various adjusted positions.

FIG. 8 is a diagrammatic representation of the picture of the timing disk gap with the firing arm therebetween and showing by a dotted line a single horizontal line as may be scanned by the video camera.

FIGS. 9 through 14B are waveform diagrams of a single horizontal video line signal and selected portions or derivatives thereof.

FIG. 15 is a block diagram of the horizontal line selector circuit used with the servo system of the invention.

FIG. 16 is a schematic diagram of the circuit of FIG. 15.

FIG. 17 is a block diagram of the differential comparing circuit and servo circuits as may be used with the invention.

FIG. 18 is a schematic diagram of the circuits of FIG. 17.

FIG. 20 and 21 are block diagrams depicting modification; and

FIG. 22 is a schematic diagram of a synthetic pulse generator.

The servo system of the invention may be used to automatically position an object relative to another object. For purposes of the present description, however, the invention will be described as it may be adapted to automatically adjust the position of the firing arm of an armament fuze in the timing disk gap thereof.

Figure 1:
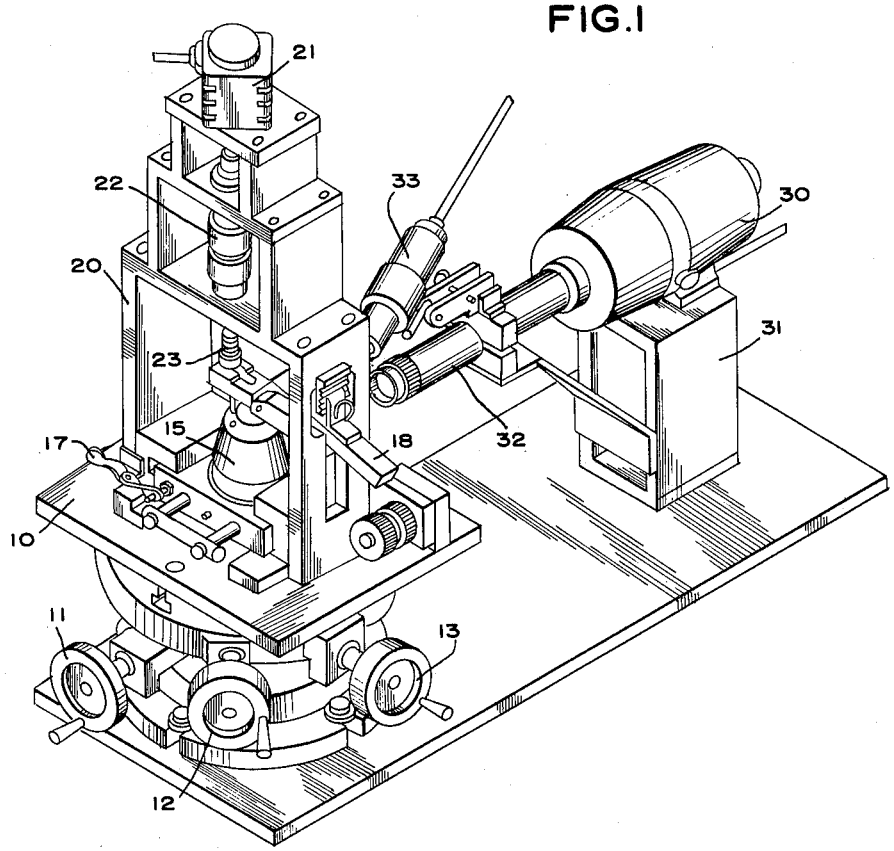
FIG. 1 is a perspective elevational view of the servo apparatus of the invention as it is adapted for adjusting the firing arm position of the armament fuze.

Referring to FIG. 1 of the drawings, the apparatus for positioning the fuze in front of the video camera together with the video camera and the servo adjusting motor are shown. A table 10 which may be adjusted into any desired position by means of the hand wheels 11, 12 or 13 is arranged to support the fuze 15 on its upper surface. To facilitate the rapid positioning of the fuze 15, chucking arrangements such as that controlled by the lever 17 is provided. Positioned above the fuze 15 in a suitable framework 20 is an electrical servo motor 21 driving through suitable spring and ratchet clutch devices 22, a screw driver element generally shown at 23. A lever 18 is provided to raise or lower the screw driver element 23 to engage the adjusting screw of the fuze 15 for adjusting the position of the fuze firing arm, as will be later described in more detail.

A video camera 30 of any conventional type is mounted on the support 31 and is provided with a lens 32 aimed at the firing arm and timing gap portion of the fuze which is visible thereto but which is not shown by FIG. 1 of the drawings. A light source 33 is also provided to direct light upon the firing arm and timing disk gap portions of the fuze 15 to be reflected back through the lens 32 onto the target of the video camera 30. It may be desirable to finish the firing arm and timing disk gap parts with a satin chrome finish in order to enhance the reflection of light therefrom onto the video camera 30. As will be later described in more detail, the composite video output signal from the video camera 30 is employed by the servo system of the invention to derive suitable direct current servo control signals for driving the servo motor 21 to position the timing disk gap at a desired point.

Referring now to FIGS. 3 and 4 of the drawings, a typical form of armament fuze which may be automatically adjusted by the servo system of the invention is shown. Numerous parts of the fuze are only fragmentarily shown since their exact form and arrangement are of no significance to an understanding of the present invention. The fuze may include a tapered cone housing 40 containing therein a firing arm 41 and a timing disk 42 having a gap 43 within which the firing arm 41 should be precisely positioned at a predetermined point. The timing disk 42 is rotatable about the pivot point 45 by means of a cam pin 46 having a slotted head 47. The servo driven screw driver 23 shown in FIG. 1 is engaged with the slotted head 47 during the adjustment operation, and the cam pin 46 may be rotated, thereby to rotate the timing disk 42 until the firing arm 41 is positioned in the desired position in the gap 43 as will be determined by the servo system of the invention.

FIGS. 5 to 7 of the drawings are enlarged diagrammatic views of the firing arm 41 and timing disk 42, showing different relative positions such as the position of FIG. 5 in which the firing arm 41 is to the extreme right, the position of FIG. 6 in which the firing arm is centered in timing disk gap, and the position of FIG. 7 in which the firing arm 41 is in the extreme lefthand position.

Referring now to FIG. 2 of the drawings, a block diagram of the entire servo system of the invention is shown. The servo motor power driven screw driver 21 is shown above the fuze 15 and the video camera 30 is shown to one side in a position to view the timing disk gap and firing arm of the fuze through the fuze window 48 (FIG. 4 of the drawings). The composite video signal output from the camera 30 is connected to the conventional camera control and video amplifying circuits 50 which normally provide the vertical and horizontal synchronization signals for the camera 30 and the amplified video output signal from the video camera 30. A monitor display 51 is connected to one of the composite video signal outputs of the camera control 50 through the connection 52. Another composite video output signal from the camera 50 is connected by the cable 53 to a horizontal video line selector and integrator circuit 54 of the invention. The specific arrangement of the video line selector and integrator 54 is shown by FIGS. 15 through 18 of the drawings and will be later described in detail. However, it may be pointed out at this time that both a vertical synchronization signal from the camera control 50 is connected by cable 55 and a horizontal synchronization signal from the camera control 50 is connected by cable 56 to the video line selector. The video line selector and integrator 54 derives from the aforementioned signals in cables 53, 55 and 56, a signal representing the scanning of a single horizontal line by the video camera 30 which may be adjusted to select the horizontal line passing through both the timing disk gap 43 and the firing arm 41. This selected horizontal line is shown by the dotted line 70 in the diagram of FIG. 8, wherein the firing arm 41 is shown to be centered in the gap of the firing disk 42. The integrator portion of the video line selector and integrator 54 derives from the signal representing the selected horizontal line, a first direct current signal proportional in amplitude to the size of the gap on one side of the firing arm 41 and a second direct current signal proportional in amplitude to the size of the gap on the other side of the firing arm 41. In accordance with the invention, one of the direct current signals may be reversed in polarity and compared with the other direct current signal to produce a difference signal. The difference signal is then compared to a reference direct current such as that supplied by the D.C. control circuit 57, as in a conventional D.C. servo whose output signal is connected to drive the servo screw driver 21. By adjusting the reference signal in the D.C. control circuit 57, the servo screw driver 21 may be driven to rotate the timing disk of the fuze until the firing arm 41 is positioned at a predetermined point in the gap of the timing disk 42. For example, if it is desired to position the timing disk 42 so that the firing arm 41 is exactly in the center of the gap 43, as shown by FIG. 8, it will be seen that the first and second direct current signals representing the size of the gap on each side of the firing arm should be equal in amplitude. If these two signals are equal in amplitude, the difference signal would be zero and if the reference voltage of the D.C. control circuit 57 is set to zero, then a zero output signal would be presented to the servo screw driver motor 21 because the firing arm 41 is exactly centered in the timing disk gap. If it is desired to position the firing arm 41 to one side or the other of the center position, then it is required that the reference voltage of the D.C. control circuit 57 be changed in polarity and amplitude to obtain the desired result, in a manner that is known to those skilled in the D.C. servo art.

Referring now to FIGS. 9 through 14B of the drawings, voltage waveforms of the various signals previously mentioned are shown. FIG. 9 shows the voltage waveform of a complete scanned horizontal line as may be selected by the video line selector 54. The waveform of FIG. 9 includes the synchronization signal portion 80, a first voltage peak 82 representing the size of the gap to the left of the firing arm 41 (FIG. 8), and a second voltage peak 81 representing the size of the gap to the right of the firing arm 41. As shown in FIG. 9, the width of the first pulse 82 is less than the width of the second pulse 81, indicating that the firing arm 41 is not exactly centered in the gap of the timing disk but is, instead, positioned slightly to the left of center.

FIG. 10 is a voltage waveform showing the signal of FIG. 9 after it has been gated or timed to select a first half line portion including only the first voltage peak 82 representing the gap on the lefthand side of the firing arm 41. FIG. 11 is a voltage waveform of the voltage peak 81 after it has been selected by suitable gating circuits to be described for selecting a second half line portion from the single horizontal line signal of FIG. 9, and representing the size of the gap on the righthand side of the firing arm 41.

FIG. 12 is the waveform of the signal shown in FIG. 10 after amplification and FIG. 14A is the waveform of the signal of FIG. 11 after amplification and also after a polarity reversal. FIG. 13 shows the amplitude of direct current signal of positive polarity which is the result of integration of the duration of signal 82 of FIG. 12. In other words, the amplitude of the direct current signal of FIG. 13 is proportional to the width or duration of the pulse 82 and therefore is proportional to the size of the gap on the left of the firing arm (FIG. 8). FIG. 14B shows the amplitude of the direct current signal of negative polarity which is correspondingly proportional to the width and duration of the pulse 81 after it has been integrated, and this signal is, therefore, proportional in amplitude to the size of the gap on the righthand side of the firing arm 41. It should now be apparent that by comparing the amplitudes of the two direct current signals of FIGS. 12 and 14B, a difference signal may be obtained which would be indicative of the exact position of the firing arm in the timing disk gap, and this difference signal may then be employed in a more or less conventional manner as a servo signal to energize the screw driver servo motor 21 as previously described.

Figure 19:
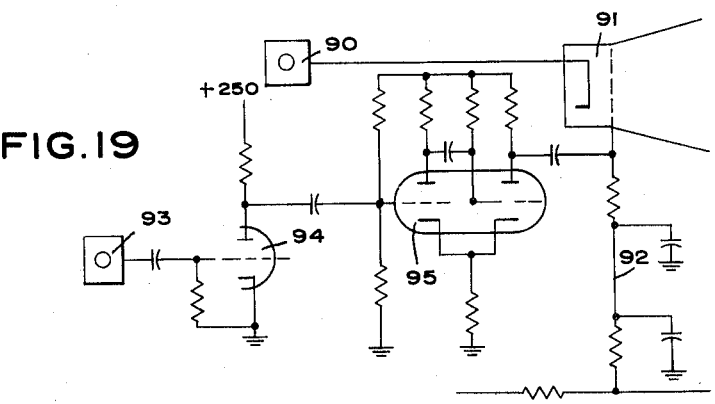
FIG. 19 is a fragmentary schematic diagram of the video amplifier circuit for the monitor showing certain alterations as may be used with the video line selector of the invention to emphasize the display of the selected horizontal video line.

As shown by FIG. 9 of the drawings, the selected horizontal line signal includes the horizontal synchronization pulse 80 at the start of the scanning of that selected horizontal line. This selected horizontal synchronization pulse 80 may be connected by the cable 59 to the monitor 51 (FIG. 2) and through suitable video amplifier circuit alterations in the monitor 51 may cause the display of the monitor to be enhanced during the display of the selected horizontal line. The details of this video amplifier gain control circuit are shown by FIG. 19 of the drawings wherein the input terminal 90 is provided to connect the composite video output signal from the camera control 50 to the cathode electrode of the cathode ray display tube 91. The brightness circuits connected to the control grid electrode of the cathode ray tube are generally shown at 92 and may be conventional. However, according to the invention, the selected horizontal synchronization signal 80 from the selected horizontal line, the waveform of which is shown by FIG. 9 of the drawings, is connected to the input terminal 93 and through the amplifier tube 94 to a timing flip-flop or gate tube 95 which is also connected to the control grid electrode of the cathode ray display tube 91 to modify the bias on the control grid for a selected time such as to enhance the brightness of the display of the cathode ray tube 91 during the time of display of the selected horizontal line only.

Referring now to FIGS. 15 and 16 of the drawings, a somewhat more detailed description of the horizontal line selector circuits of the invention will be given. These circuits include, as shown by the block diagram, a differentiator 100, a trigger amplifier 101, a bi-stable flip-flop circuit 102, a differentiator 103, an inverter amplifier 104, a variable gate generator 105, a differentiator 106, a 60-microsecond generator 107, a coincidence mixer 108, an inverter amplifier 109, a 65-microsecond generator 110, a coincidence mixer 111, and a cathode follower 112. A vertical synchronization signal from the camera control 50 is connected through cable 55 (FIG. 2) to the input terminal 113 of the differentiator circuit 100. The differentiated pulse provides a positive leading edge pulse for triggering the grid electrode of the trigger amplifier tube 101. The resulting negative pulse at the plate of tube 101 is amplified and fed to the bi-stable flip-flop tube 102 to be triggered thereby. Thus, a half square wave cycle is produced by each vertical synchronization pulse from trigger tube 101. This half square wave cycle pulse is differentiated at the control grid 114 of the differentiator 103. The single positive pulse resulting thereby from two successive vertical synchronization pulses is then amplified by the inverter amplifier 104 to become a positive pulse at the plate electrode 115. This positive pulse is then used to trigger the mono-stable multivibrator, including tubes 116 and 117, the recovery time being determined by the plate voltage of the plate electrodes of tube 116, which is determined by the voltage generated at cathode electrode 118 of tube 119. Tube 119 which is a dual triode tube as shown is connected in a gate length control circuit which is adjustable by the setting of the potentiometer 120. The negative half cycle waveform is then amplified by tube 121 and the leading edge of the amplified waveform is shaped by the signal on the grid electrode 122 connected thereto by the circuit including the capacitor 123 to the plate electrode 115 of tube 104.

The waveform of the gate length pulse can be observed at test point 124. The circuit constants in the grid circuit 106 differentiate the gate length waveform into two voltage peaks including a negative pulse and a positive pulse which is variable in time from the negative pulse. The positive pulse triggers the mono-stable multi-vibrator tube 107 which is the aforementioned 60-microsecond generator. As determined by the time constants of the capacitor and resistance networks in the mono-stable multi-vibrator plate circuits, a 60-microsecond positive pulse, the leading edge of which is variable from the leading edge of the original vertical synchronization pulse within a range of zero to 18K microseconds, is obtained. This positive microsecond pulse may be observed at test point 130 and is connected to one of the control grids of the coincidence mixer tube 108. A signal from the composite video output signal and containing the horizontal synchronization pulses is connected to the terminal 131 and therefrom to the other control grid electrode of the coincidence mixer tube 108. As the positive pulse from the 60-microsecond generator 107 can be varied over the length of one field of the television picture, it is possible to coincide the positive portion with any one of the horizontal synchronization pulses in that field, and thereby obtain a single gated horizontal synchronization pulse at the plate electrode of tube 108 and test point 132.

The signal representing the selected or gated horizontal synchronization pulse is amplified by the amplifier 109 and is available at test point 133 to trigger a cathode ray trace of the monitor tube as previously described so that a single video line could be observed without further circuitry. In addition, however, the pulse appearing at the plate electrode of inverter amplifier 109 is connected to the grid of the 65-microsecond generator tube 110 which is intended to generate a pulse having a duration of 65 microseconds for gating the selected video line signal. The selected horizontal synchronization pulse from inverter amplifier tube 109 opens the gate of the generator tube 110 and the time constants to determine the 65-microsecond duration are provided by the resistance-capacitance components in the plate and grid circuits of tube 110. The pulse representative of the 65-microsecond interval is available at test point 134 and it in turn is fed to one of the control grids of the coincidence mixer tube 111. The composite video signal from the camera control circuit is connected to input terminal 135 and to the other control grid electrode of the coincidence mixer tube 111. Thus the composite video signal from input terminal 135 is gated through the coincidence mixer tube 111 for the duration of the 65-microsecond pulse which had been initially timed to occur at the start of the selected horizontal line being scanned. A cathode follower output tube 112 is provided to lower the impedance of the signal representative of the selected horizontal line which is thereby available at the test point 137.

The selected horizontal line signal from the test point terminal 137 is connected to the circuits of FIGS. 17 and 18 of the drawings, which will now be referred to, for describing the means for deriving from the single horizontal line signal the previously-mentioned direct current signals to be used for controlling the direct current servo motor. Referring first more particularly to the block diagram of FIG. 17, the general arrangement of the integrator and servo control circuit portions of the invention will be set forth. It should be pointed out that reference numerals for the blocks of block diagram of FIG. 17 will be applied where appropriate to the elements of the schematic diagram of FIG. 18 in a similar manner to that which was done in connection with FIGS. 15 and 16 of the drawings. The block diagram of FIG. 17 includes an integrator circuit 150, a delay amplifier 151, an inverter amplifier 152, a differentiator 153, a 27-microsecond generator 154, an inverter amplifier 155, a coincidence mixer 156, a differentiator 157, a 23-microsecond generator 158, a coincidence mixer 159, an inverter amplifier 160, a left video channel amplifier 161, an inverter amplifier 162, a right video channel amplifier 163, a cathode follower 164, an inverter amplifier 165, a cathode follower 166, a clamper 167, a limiter 168, amplitude adjustment control 169, a clamper 170, a limiter 171, a comparator-integrator 174, and a direct current control 175, to the D.C. servo motor 176.

The single selected horizontal line video signal from the terminal 137 contains the desired information as previously shown by the waveform of FIG. 9 of the drawings, and includes the synchronization signal and blanking pulses at the beginning of the horizontal line. It is desirable to eliminate the synchronization signal and blanking pulse in order to obtain signals of waveforms comparable to FIGS. 10 and 11 of the drawings. In order to accomplish this result, the line selector gate signal from test point 134 is connected to the input terminal 180 and is integrated by the integrator 150 for connection to the grid circuit of the delay amplifier tube 151. The grid of the delay amplifier tube 151 is biased beyond cut-off and when the line selector gate signal reaches the cut-off point, a new signal is started. This results in a negative delayed gate pulse at the control grid of the inverter amplifier tube 152 and a positive delayed gate pulse at the plate electrode of the amplifier tube 152. The positive gate pulse is differentiated and the positive pulse is then connected to trigger the 27-microsecond generator 154. This results in a new gating signal with the beginning of the gate delayed by the width of the blanking pulse, and this gating signal is timed for a duration of approximately one-half of the selected video line signal. The single selected horizontal video line signal is connected to the control grid of the coincidence mixer 159 from the selected video line output terminal 137 (FIG. 16) to the input terminal 181 (FIG. 18). The gate signal for the first half of the video line is connected to the other control grid electrode of the coincidence mixer 159 by means of the conductor 182. Therefore, a signal representative of the first half of the selected horizontal video line information is available at test point 184.

The aforementioned half line gate signal is also connected to the inverter amplifier 155 and is inverted so that the trailing edge results in a positive pulse at the grid electrode of the 23-microsecond generator 158. This positive pulse triggers a half line gate similar to that previously triggered by the 27-microsecond generator 154 and when the signal from the 23-microsecond generator 158 is connected to the coincidence mixer 156 simultaneously with the video signal in a similar manner to that as was described in connection with the coincidence mixer 159, the second half of the selected video line signal is available at test point 183.

The signal representing the first half of the selected horizontal line signal as appearing at test point 184 is shaped and amplified by the inverter amplifier 162 and the left video channel amplifier 163, and is connected to the cathode follower 164 which provides a negative polarity signal. Thus, the negative signal corresponding to the signal 81 (FIG. 14A) is obtained with a width that is indicative of the size of the gap on the lefthand side of the firing arm. It will be noted that the signal from terminal 183 is also connected to an inverter amplifier 160 and a right video channel amplifier 161, yet another inverter amplifier 165, and a cathode follower 166, so that the signal at terminal 185 is of negative polarity with a width indicative of the size of the gap on the righthand side of the firing arm. The level of the righthand side signal may be adjusted by means of the level or amplitude adjustment potentiometer 177. This is desirable in order that the amplitudes of the respective signals for the left and right side portions of the selected horizontal video line may be adjusted to be equal. It has been pointed out that the duration of the gap signals is indicative of the spacing and size of the gaps and, therefore, the amplitude of these signals at this point are not significant.

The video signals which have been previously described as being available at terminals 178 and 179 respectively, are connected to oppose each other and are clamped and integrated by the circuits including the clampers and limiters 167, 168, 170 and 171, and the comparator-integrator generally shown at 174. The resulting direct current signals whose amplitudes are proportional to the sizes of the respective gaps on each side of the firing arm, are algebraically added and are then combined with an adjustable direct current reference signal from the battery 192 and resistance network including the potentiometer 175. The adjustment of the potentiometer 175 provides the initial set point to control the direct current servo system in a conventional manner to position the firing arm at the desired position. The operation of the set point or reference voltage has been previously described and will not be further described in detail at this time.

The difference voltage signal is connected to drive the D.C. servo motor 176 which may be the same motor as the screw driver motor 21, previously described in connection with FIG. 1. The amplitude and polarity of the signals will drive the D.C. servo motor in the requisite direction to adjust the firing arm to the desired position, at which time the signal appearing across the D.C. servo input will be zero.

Referring again to FIG. 3 of the drawings, the system as above described, assumes that the timing disk gap 43 and the firing arm 41, will have identical widths for every fuze. In practice, this is not always possible. One can still adjacent the timing disk to any preselected position by the addition of a synthetic pulse generator 183 and a servo motor 184, which is identical to servo motor 21 as shown in FIG. 20.

The logic of such a practical system is as follows:

Referring to FIG. 9, it is obvious that if the left gap 82 and the right gap 81 are not equal, an error signal will appear at the input of the D.C. servo. This error signal is amplified and the output signal then energizes the servo 21 which moves the timing disk in such a direction that the left gap and right gap are made equal. The servo 21 is disconnected. Electronically, the signal corresponding to the right gap is removed, i.e., switch S1 (FIG. 18) is closed. The D.C. servo now has an error signal larger than zero but the servo 21 cannot move because it is disconnected. Switch SA (FIG. 20) is now connected to servo motor 184. This servo motor is mechanically coupled to a potentiometer in the synthetic pulse generator 183, which will rotate in such a direction as to duplicate the original right gap signal. The output of the synthetic pulse generator 185 is connected to the grid electrode of inverter amplifier 160 after switch S2 is closed as indicated in FIG. 18. Servo motor 184 is disconnected and switch S3, shown in FIG. 22, is opened. When switch S3 is opened the synthetic right gap signal generated, as set forth above, is duplicated.

The D.C. servo now has an error signal at its output but servo motor 21 cannot move because it is disconnected. Switch SA now reconnects servo motor 21 and the error signal now energizes the servo motor which moves the right edge of the timing disk 43 in coincidence with the right edge of the firing arm 41 (FIG. 5). This coincidence will always occur even if the timing disk gap 43 or firing arm 41 vary in width from one fuze to the next. Then, by applying a D.C. voltage from the D.C. control circuit 57, of a given polarity and amplitude, the timing disk can be positioned anywhere desired with reference to the firing arm 41.

Referring now to FIGS. 21 and 22 of the drawings, a somewhat more detailed description of the synthetic pulse generator will be given. These circuits include, as shown by the block diagram, a trigger amplifier 186, a blocking oscillator 187, a 135-microsecond generator 188, an inverter amplifier 189, a differentiator 190, a blocking oscillator 191, a cathode follower 193, a variable gate generator 194, an inverter amplifier 195 and a servo motor 96. The selected horizontal synchronization signal 59 is connected to the grid electrode of the trigger amplifier 186. The trigger amplifier output signal at 196 is use to trigger the blocking oscillator 187, its output being a very narrow pulse which is connected to the grid electrode of cathode follower 193. The signal at the cathode 197 is used for triggering the variable gate generator 194, and the width is determined by the voltage at the grid of the generator 194. The servo motor 96 determines the position of the potentiometer 198 which in turn controls the voltage applied to the grid electrode of the variable gate generator 194. The inverter amplifier 195 reverses the polarity of the signal applied to its grid electrode and this output signal 185, is applied to S2 (FIG. 18).

The amplified selected horizontal synchronization signal 196, is also used to trigger the 135-microsecond generator 188. This output signal has its polarity inverted in amplifier 189 then this gate pulse is differentiated in differentiator 190. The trailing edge of the pulse is used to trigger the blocking oscillator 191 whose output is a very narrow pulse. This pulse does not reach the grid electrode 199 of the cathode follower 193 because S3 (FIG. 22) is originally closed. After the servo motor 96 generates a signal which is equivalent to the original balanced signal, the servo motor is disconnected. The switch S3 is then opened and a duplicate signal appears at the output 185, which is delayed by 135 microseconds.

In the foregoing specification, video responsive servo operated systems for adjusting the positon of one object relative to another and for simultaneously displaying the positions of the objects during the adjustment have been described. Although a particular type of direct current servo system has been specifically referred to, it should be understood that the signals derived from the selected horizontal line from the video control circuits of the invention may be connected in any suitable fashion to operate other types of servo systems which may or may not employ direct current motors or the like. Also, although a monitor for visually displaying the selected horizontal line and the objects being scanned by the video camera and control system of the invention has been described, it should be apparent that the monitor may be dispensed with if the viewing of the servo adjusting operation is not required.

As will be clear to those skilled in the art, such a video responsive servo system can also position an object to any preselected position in the field of view by providing a preselected set of electrical values which represent the desired end position.

Various modifications will occur to those skilled in the art within the spirit of the invention and the scope of the appended claims.

What is claimed is:

1. Apparatus for relatively positioning a first object with respect to a second object comprising, a video camera, means for directing light from said objects on to said camera, said camera thereby providing a composite video output signal of said objects, means for selecting from said composite signal a line signal representative of a single straight line passing through said objects, means for deriving from said line signal a first direct current signal proportional in amplitude to the distance between said first object and a point on said second object, means for deriving from said line signal a second direct current signal proportional in amplitude to the distance between said first object and a point on said second object, means for comparing the amplitudes of said first and second direct current signals to produce a difference signal proportional in amplitude to the difference between said first and second signals, and servo means responsive to said difference signal for relatively moving said objects to a position in which said first and second signals are equal to predetermined values.

2. Apparatus according to claim 1 including a monitor display cathode ray tube connected to said composite video signal to produce a visual display of said objects, and monitor control means connecting said monitor display to said line selecting means to enhance the brillance of the display of the selected horizontal line by said monitor.

3. Apparatus for relatively positioning a first object with respect to a second object comprising, a video camera, means for directing light from said objects onto said camera, means for selecting from the composite video output signal of said camera a video line signal representing a straight line passing through said objects, means for separating said line signal into a first half line signal and a second half line signal, means for converting said first half signal into a first direct current voltage proportional in amplitude to the distance between said first object and a point on said second object, means to convert the second half signal into a second direct current voltage proportional in amplitude to the distance between said first object and a point on said second object, means to compare said first and second direct current voltages to produce a difference voltage, and servo means responsive to said difference voltage for relatively moving said objects to render said first and second direct current voltages equal to predetermined values.

4. Apparatus according to claim 3 including a monitor display cathode ray tube connected to said composite video signal to produce a visual display of said objects, and monitor control means connecting said monitor display to said line selecting means to enhance the brillance of the display of the selected straight line by said monitor.

5. Apparatus for positioning an object in a gap of a second object comprising, a video camera, means for reflecting light from said objects onto said camera, said camera thereby providing a composite video output signal representative of the first said object in the gap, means for selecting from said composite signal a line signal representative of a single line passing through said first object and gap, means for deriving from said line signal a first direct current signal proportional in amplitude to the size of the gap on one side of said first object, means for deriving from said line signal a second direct current signal proportional in amplitude to the size of the gap on the other side of said first object, means for comparing the amplitudes of said first and second direct current signals to produce a difference signal proportional in amplitude to the difference between said first and second signals, and servo means responsive to said difference signal for relatively moving said objects to render said first and second signals equal to predetermined values.

6. Apparatus according to claim 5 including a monitor display cathode ray tube connected to said composite video signal to produce a visual display of the first said object in the gap, and monitor control means connecting said monitor display to said line selecting means to enhance the brilliance of the display of the selected line by said monitor.

7. A video responsive servo fuze setting system for positioning a fuze firing arm in the gap of a timing disk comprising, a video camera, means for reflecting light from the object and gap onto said camera, means for selecting from the composite video output signal of said camera a video line signal representing a horizontal line passing through said arm and gap, means for separating said line signal into a first half line signal and a second half line signal, means for converting said first half signal into a first direct current voltage proportional in amplitude to the size of the gap on one side of said arm, means for converting said second half signal into a second direct current voltage proportional in amplitude to the size of the gap on the other side of said arm, means to compare said first and second direct current coltage to produce a difference voltage, and servo means responsive to said difference voltage for moving said arm to position the arm in the gap such that said first and second direct current voltages are equal to predetermined values.

8. Apparatus according to claim 7 including a monitor display cathode ray tube connected to said composite video signal to produce a visual display of the object in the gap, and monitor control means connecting said monitor display to said line selecting means to enhance the brilliance of the display of the selected horizontal line by said monitor.

9. A video responsive servo alignment system for positioning an object in a gap comprising, a video camera, means for reflecting light from the object and gap onto said camera, said camera thereby providing a composite video output signal of said object and gap, means for selecting from said composite signal a line signal representative of a single horizontal line passing through said object and gap, means for deriving from said line signal a first direct current signal of one polarity proportional in amplitude to the size of said gap on one side of the object in the gap, means for deriving from said line signal a second direct current signal of opposite polarity to said first direct current signal and proportional in amplitude to the size of the gap on the other side of the object in the gap, means for algebraically adding said first and second direct current signals to produce a difference signal proportional in amplitude and polarity to the difference between said first and second signals, and servo means responsive to the polarity and amplitude of said difference signal for moving said object in said gap to position the object such that said first and second signals are equal to predetermined values.

10. The system of claim 9 including a monitor display cathode ray tube connected to said composite video signal to produce a visual display of the object in the gap, and monitor control means connecting said monitor display to said line selecting means to enhance the brilliance of the display of the selected horizontal line by said monitor.

11. A video responsive servo alignment system for positioning an object in a gap comprising, a video camera, means for reflecting light from the object and gap onto said camera, means for selecting from the composite video output signal of said camera a video line signal representing a horizontal line passing through said object and gap, means for separating said line signal into a first half line signal and a second half line signal, means for converting said first half signal into a first direct current voltage of one polarity proportional in amplitude to the size of the gap on one side of the object in the gap, means to convert the second half signal into a second direct current voltage of opposite polarity to said first direct current voltage and proportional in amplitude to the size of the gap on the other side of the object in the gap, means to algebraically add said first and second direct current voltages to produce a difference voltage, and servo means responsive to the polarity and amplitude of said difference voltage for moving said object in said gap to position the object such that said first and second direct current voltages are equal to predetermined values.

12. The system of claim 11 including a monitor display cathode ray tube connected to said composite video signal to produce a visual display of the object in the gap, and monitor control means connecting said monitor display to said line selecting means to enhance the brilliance of the display of the selected horizontal line by said monitor.

13. A video responsive servo alignment system for positioning an object in a gap comprising, a video camera, means for reflecting light from the object and gap onto said camera, said camera providing a composite video output signal of said object and gap together with vertical and horizontal synchonization signals, gating means responsive to the vertical synchronization signal for selecting from said composite signal a line signal representative of a single horizontal line passing through said object and gap, means for deriving from said line signal a first direct current signal proportional in amplitude to the size of said gap on one side of the object in the gap, means for deriving from said line signal a second direct current signal proportional in amplitude to the size of the gap on the other side of the object in the gap, means for comparing the amplitudes of said first and second direct current signals to produce a difference signal proportional in amplitude to the difference between said first and second signals, and servo means responsive to said difference signals for moving said object in said gap to position the object such that said first and second signals are equal to predetermined values.

14. The system of claim 13 including a monitor display cathode ray tube conected to said composite video signal to produce a visual display of the object in the gap, and monitor control means connecting said monitor display to said line selecting means to enhance the brilliance of the display of the selected horizontal line by said monitor.

15. A video responsive servo alignment system for positioning an object in a gap comprising, a video camera, means for reflecting light from the object and gap onto said camera, said camera providing a composite video output signal together with vertical and horizontal synchronization signals, gating means responsive to said vertical synchronzation signal for selecting from the composite video output signal of said camera a video line signal representing a horizontal line passing through said object and gap, gating means responsive to said horizontal synchronization signal for separating said line signal into a first half line signal and a second half line signal, means for converting said first half signal into a first direct current voltage proportional in amplitude to the size of the gap on one side of the object in the gap, means to convert the second half signal into a second direct current voltage proportional in amplitude to the size of the gap on the other side of the object in the gap, means to compare said first and second direct current voltages to produce a difference voltage, and servo means responsive to said difference voltage for moving said object in said gap to position the object such that said first and second direct current voltages are equal to predetermined values.

16. The system of claim 15 including a monitor display cathode ray tube connected to said composite video signal to produce a visual display of the object in the gap, and monitor control means connecting said monitor display to said line selecting means to enhance the brilliance of the display of the selected horizontal line by said monitor.

17. A video responsive servo alignment system for positioning an object in a gap comprising, a video camera, means for reflecting light from the object and gap onto said camera, said camera thereby providing a composite video output signal of said object and gap together with vertical and horizontal synchronization signals, gating means responsive to the vertical synchronization signal for selecting from said composite signal a line signal representative of a single horizontal line passing through said object and gap, means for deriving from said line signal a first direct current signal of one polarity proportional in amplitude to the size of said gap on one side of the object in the gap, means for deriving from said line signal a second direct current signal of opposite polarity to said first direct current signal and proportional in amplitude to the size of the gap on the other side of the object in the gap, means for algebraically adding said first and second direct current signals to produce a difference signal proportional in amplitude and polarity to the difference between said first and second signals, and servo means responsive to the polarity and amplitude of said difference signal for moving said object in said gap to position the object such that said first and second signals are equal to predetermined values.

18. The system of claim 17 including a monitor display cathode ray tube connected to said composite video signal to produce a visual display of the object in the gap, and monitor control means connecting said monitor display to said line selecting means to enhance the brilliance of the display of the selected horizontal line by said monitor.

19. A video responsive servo alignment system for positioning an object in a gap comprising, a video camera, means for reflecting light from the object and gap onto said camera, said camera providing a composite video output signal together with vertical and horizontal synchronization signals, gating means responsive to said vertical synchronization signal for selecting from the composite video output signal of said camera a video line signal representing a horizontal line passing through said object and gap, gating means responsive to said horizontal synchronization signal for separating said line signal into a first half line signal and a second half line signal, means for converting said first half signal into a first direct current voltage of one polarity proportional in amplitude to the size of the gap on one side of the object in the gap, means to convert the second half signal into a second direct current voltage of opposite polarity to said first direct current voltage and proportional in amplitude to the size of the gap on the other side of the object in the gap, means to algebraically add said first and second direct current voltages to produce a difference voltage, and servo means responsive to the polarity and amplitude of said difference voltage for moving said object in said gap to position the object such that said first and second direct current voltages are equal to predetermined values.

20. The system of claim 19 including a monitor display cathode ray tube connected to said composite video signal to produce a visual display of the object in the gap, and monitor control means connecting said monitor display to said line selecting means to enhance the brilliance of the display of the selected horizontal line by said monitor.

References Cited by the Examiner

FOREIGN PATENTS 845,296    8/1960    Great Britain.

DAVID G. REDINBAUGH, *Primary Examiner.*

R. L. RICHARDSON, *Assistant Examiner.*